United States Patent
Desigowda et al.

(10) Patent No.: US 10,530,641 B2
(45) Date of Patent: Jan. 7, 2020

(54) UNINTERRUPTED FLOW PROCESSING BY A SOFTWARE DEFINED NETWORK (SDN) APPLIANCE DESPITE A LOST OR DISRUPTED CONNECTION WITH AN SDN CONTROLLER

(71) Applicant: Fortinet, Inc., Sunnyvale, CA (US)

(72) Inventors: Shivashakara Desigowda, San Jose, CA (US); Sashidhar V. Annuluru, Cupertino, CA (US); Venkateswara Adusumilli, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 107 days.

(21) Appl. No.: 15/477,111

(22) Filed: Apr. 2, 2017

(65) Prior Publication Data
US 2018/0287859 A1 Oct. 4, 2018

(51) Int. Cl.
*H04L 12/24* (2006.01)
(52) U.S. Cl.
CPC ...... *H04L 41/0695* (2013.01); *H04L 41/0816* (2013.01)
(58) Field of Classification Search
CPC ..... H04L 41/0654; H04L 47/20; H04L 41/20; H04L 41/0893
See application file for complete search history.

(56) References Cited

U.S. PATENT DOCUMENTS

| 2016/0065454 A1* | 3/2016 | Arumugam | H04L 45/38 370/389 |
| 2017/0093686 A1* | 3/2017 | Uttaro | H04L 45/021 |
| 2017/0149614 A1* | 5/2017 | Zheng | H04L 41/12 |

OTHER PUBLICATIONS

Goransson, Paul, et al. "Genesis of SDN",.. ScienceDirect, Software Defined Networks (Second Edition), 2017, 15 pages.
"Openflow Switch Specification, Version 1.0.0", Open Networking Foundation, Dec. 31, 2009, 44 pages.

* cited by examiner

*Primary Examiner* — Jackie Zuniga Abad
(74) *Attorney, Agent, or Firm* — Jaffrey Watson Mendonsa & Hamilton, LLP (57) ABSTRACT

Systems and methods for allowing continuous network traffic processing by an SDN appliance despite a lost or disrupted connection with an SDN controller are provided. According to one embodiment, a software-defined networking (SDN) appliance receives one or more policies/flows from an SDN controller. The policies/flows are locally stored by the SDN appliance within the SDN appliance. Responsive to receipt of a packet to be processed by the SDN appliance, the SDN appliance queries the SDN controller for an appropriate policy or flow for the packet. When a response to the query is not received from the SDN controller within a predefined or configurable timeout period, the SDN appliance processes the packet based on the locally stored one or more policies/flows.

20 Claims, 10 Drawing Sheets

UNINTERRUPTED FLOW PROCESSING BY A SOFTWARE DEFINED NETWORK (SDN) APPLIANCE DESPITE A LOST OR DISRUPTED CONNECTION WITH AN SDN CONTROLLER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to software-defined networking (SDN). In particular, embodiments of the present invention relate to managing policies/flows by an SDN appliance for continuous packet processing when a connection between an SDN controller and an SDN appliance is lost or disrupted for one of many possible reasons, including, but not limited to, a planned or unplanned restart of the SDN controller or the SDN appliance or a failover from one SDN controller to another, for example.

Description of the Related Art

Conventional networks generally include multiple interconnected network devices, e.g., switches, routers, etc., that are each configured to receive and process (e.g., forward and/or route as appropriate) packets and/or frames according to their respective internal settings. These internal settings are generally configured at provisioning and may require physical access to the network device in order to change settings. In some cases, the configurations may be proprietary. Further, the network devices are typically configured with only a local view of a portion of the network, e.g., for fault tolerance. Each network device is configured to make routing and/or forwarding decisions based on this local view. Thus, such network devices may not be responsive to dynamically changing network traffic, changes to node(s) coupled to the network and/or to mobility of user devices connected to the network.

SDN is intended to address many of these characteristics of such conventional network architectures. SDN is designed to decouple the data plane (i.e., the underlying systems and devices that forward traffic to the selected destination) from the control plane (i.e., the systems that makes decisions about where and how traffic is sent by way of routing decision rules and policies, for example). In SDN, the control plane may be centralized and/or may be distributed and the data plane may include multiple interconnected network devices that are remotely programmable by the control plane. SDN is therefore an emerging field of computer networking that manages, controls, and delivers data packets to a desired destination. One goal of SDN is to allow the network to be programmable via an SDN controller, which is typically physically separated from any of the controlled network switches, but is not necessarily located remotely therefrom. Those skilled in the art appreciate that there are a variety of ways to implement SDN controllers, including, but not limited to, implementation based on the open source NOX platform for building network control applications, based on the PDX platform, the Beacon OpenFlow controller, the Floodlight open SDN controller or the OpenDaylight open source SDN controller. The SDN controller acts as a strategic and centralized control point to manage flow control of data packets to different SDN appliances, wherein the SDN controller communicates with different SDN appliances (e.g., any SDN flow processing device, including a switch, a router or the like) by using an array of protocols e.g., OpenFlow, YANG and NetConf. An SDN controller that supports an open application programming interface, for example, the OpenFlow protocol, can transmit flow programming information regarding active flows, flow processing directives, flow control policies and/or other flow control information to SDN appliances over a Transmission Control Protocol (TCP)/Internet Protocol (IP) network connection.

However, if the TCP/IP connection that is used to transfer flow control information and other data from the SDN controller to one or more of the SDN appliances is lost (for various reasons, e.g., SDN controller failover, planned or unplanned SDN appliance restart) or the communication is otherwise delayed because of a TCP/IP path refresh, for example, there will be traffic disruption at the affected SDN appliance(s) as packets cannot be processed due to a lack of flow control information.

There is therefore a need for a system and method that allows an SDN appliance to continue to process network traffic even when the connection between the SDN controller and the SDN appliance is lost or disrupted.

SUMMARY

Systems and methods are described for allowing continuous network traffic processing by an SDN appliance despite a lost or disrupted connection with an SDN controller. According to one embodiment, a software-defined networking (SDN) appliance receives one or more policies/flows from an SDN controller. The policies/flows are locally stored by the SDN appliance within the SDN appliance. Responsive to receipt of a packet to be processed by the SDN appliance, the SDN appliance queries the SDN controller for an appropriate policy or flow for the packet. When a response to the query is not received from the SDN controller within a predefined or configurable timeout period, the SDN appliance processes the packet based on the locally stored one or more policies/flows.

Other features of embodiments of the present disclosure will be apparent from accompanying drawings and from detailed description that follows.

BRIEF DESCRIPTION OF DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF DRAWINGS

Systems and methods are described for allowing continuous network traffic processing by an SDN appliance despite a lost or disrupted connection with an SDN controller. According to one embodiment, dynamic flows/polices provided by the SDN controller are stored locally on the SDN appliance itself and used when the connection between the SDN appliance and the SDN controller is unavailable. In this manner, known good rules are applied to the traffic passing thru the SDN appliance. These stored flows/policies are kept valid until the SDN appliance re-establishes the connection with the SDN controller or a configured lifetime is expired. Upon establishing the connection with the SDN controller, one of the following actions can be taken: (i) All the flows/policies are removed because the SDN controller is going to push a new flow/policy set; or (ii) The old policy set is retained and an aging timer is started for each entry. When the SDN controller pushes the new flow/policy set, corresponding old flow/policy entries are replaced with new ones and old flow/policy entries that are not refreshed by the SDN controller are aged out. Such an approach has the following benefits: (i) The time interval to apply traffic policies during a network interruption is reduced; (ii) after a planned or unplanned restart, the SDN appliance is operational in less time and with known security policies, thereby allowing network traffic to be properly inspected and passed through the SDN appliance, without simply dropping or passing network traffic without proper inspection; (iii) the SDN appliance can continue to operate with a good known set of rules even when the SDN controller itself is down; and (iv) for production networks, the customer can have a default golden policy set on every SDN appliance, which may be used when the connection between the SDN appliance and the SDN controller is unavailable for any reason.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

In an aspect, the present disclosures relates to a method for managing policies/flows for packet processing when a connection between an SDN controller and an SDN appliance is disrupted (for whatever reason, e.g., a planned or unplanned restart of the SDN controller or the SDN appliance or a failover from one SDN controller to another), wherein management of the policies/flows for packet processing includes: receiving by an SDN appliance, from an SDN controller, one or more policies/flows; locally storing, within the SDN appliance, the received one or more policies/flows; and responsive to receipt of a packet to be processed by the SDN appliance, sending, by the SDN appliance, a query to the SDN controller requesting an appropriate policy or flow for the packet such that when a response to the query is not received from the SDN controller within a predefined or configurable period of time, the SDN appliance processes the packet based on the locally stored policies/flows.

In an embodiment, the locally stored policies/flows can be invalidated by the SDN appliance when a connection is re-established between the SDN controller and the SDN appliance. In another embodiment, responsive to connection re-establishment between the SDN controller and the SDN appliance, at least a subset of the locally stored policies/flows can be removed and replaced, by the SDN appliance, by a new set of policies/flows received from the SDN controller. In yet another embodiment, responsive to re-establishment of the connection between the SDN controller and the SDN appliance, the locally stored policies/flows can be either replaced with corresponding new policies/flows received from the SDN controller or are aged out by implementing, by the SDN appliance, an aging timer for the locally stored policies/flows. In an embodiment, a lifetime can be associated with the locally stored policies/flows such that upon expiration of the lifetime, the locally stored policies/flows are rendered invalid.

In an aspect, the SDN appliance can include any or a combination of a physical or virtual switch, gateway, router, network security device, wireless access point and server. In another aspect, the policies/flows can include any or a combination of policies for any of packet flow detection, packet flow processing, connection management, error detection, and a timer to identify expired policies.

In an aspect, the present disclosure relates to a system for managing policies/flows for packet processing, wherein the system includes a non-transitory storage device having embodied therein one or more routines operable to facilitate managing policies/flows for packet processing in an SDN appliance; one or more processors coupled to the non-transitory storage device and operable to execute the one or more routines, wherein the one or more routines include: a policy/flow receive module, which when executed by the one or more processors, receives, at the SDN appliance, from an SDN controller, one or more policies/flows; a policy/flow local storage module, which when executed by the one or more processors, locally stores the received policies/flows at the SDN appliance; and a local policy/flow based packet processing module, which when executed by the one or more processors, upon receipt of a packet, enables the SDN appliance to use the locally stored policies/flows for processing the packet when the SDN controller is not reachable.

Figure 1A:
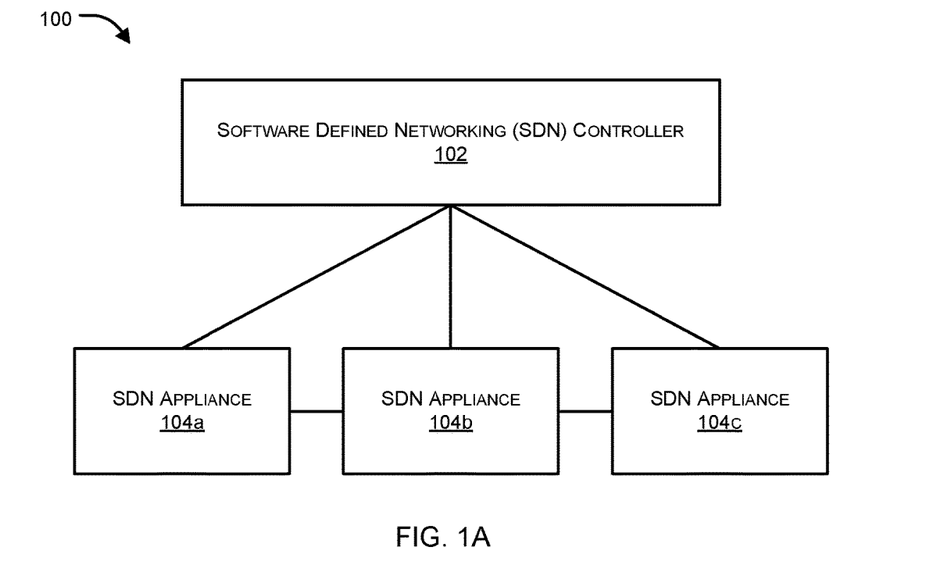
FIGS. 1A and 1B illustrate exemplary communication mechanisms between an SDN controller and SDN appliances that may be used with embodiments of the present invention.
Figure 1B:
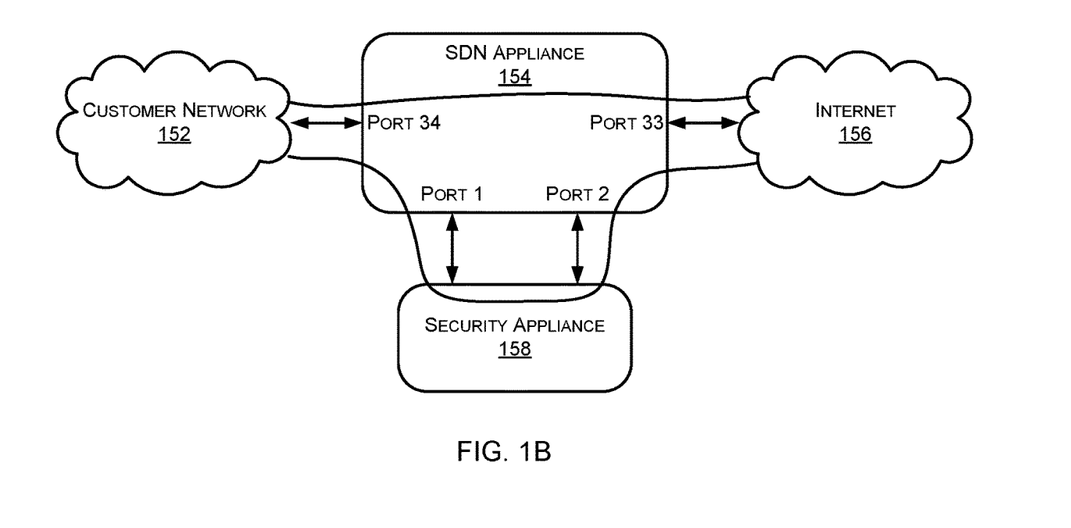

FIGS. 1A and 1B illustrate exemplary communication mechanisms between an SDN controller and SDN appliances that may be used with embodiments of the present invention. FIG. 1A illustrates an simplified view of an SDN network 100 including various SDN appliances 104a, 104b, and 104c, which may be in the form of physical or virtual switches, gateways, routers, network security devices, wireless access points, servers or other packet processing devices, that are connected to an SDN controller 102. SDN network 100 may represent a private network, a data center or the like of an enterprise. SDN controller 102 intelligently manages network flow control of packets. SDN controller 102 acts as a strategic control point in SDN network 100 and is configured to manage packet flow control through one or more northbound and southbound application programming interfaces (APIs). SDN controller 102 enables packet flow communication between itself and SDN appliances 104a, 104b, and 104c by using multiple protocols, including but not limited to, OpenFlow, OVSDB, YANG and NetConf.

FIG. 1B illustrates an SDN appliance 154 that communicates with various appliances/networks/devices through one or more hardware ports or peripheral ports. SDN appliance 154 establishes communication between itself and a customer network 152, wherein the network 152 can transmit/receive data packets to/from external resources of an external network, e.g., the Internet 156, utilizing Port 34 and Port 33 of SDN appliance 154. SDN appliance 154 can also be connected to a network security device, e.g., security appliance 158, through peripheral ports, e.g., Port 1 and Port 2, which may also be utilized in connection with establishing communication between customer network 152 and Internet 156. Security appliance 158 may represent any of a variety of current or future network security devices, including, but not limited to, a Unified Threat Management (UTM) device, a firewall, a gateway device, an anti-virus engine, a sandbox, an Intrusion Prevention System (IPS), an Intrusion Detection System (IDS), and a Deep Packet Inspection (DPI) system. Any of customer network 152, SDN appliance 154, Internet 156, and security appliance 158 can communicate with other external/operatively coupled devices by utilizing peripheral ports.

Figure 2A:
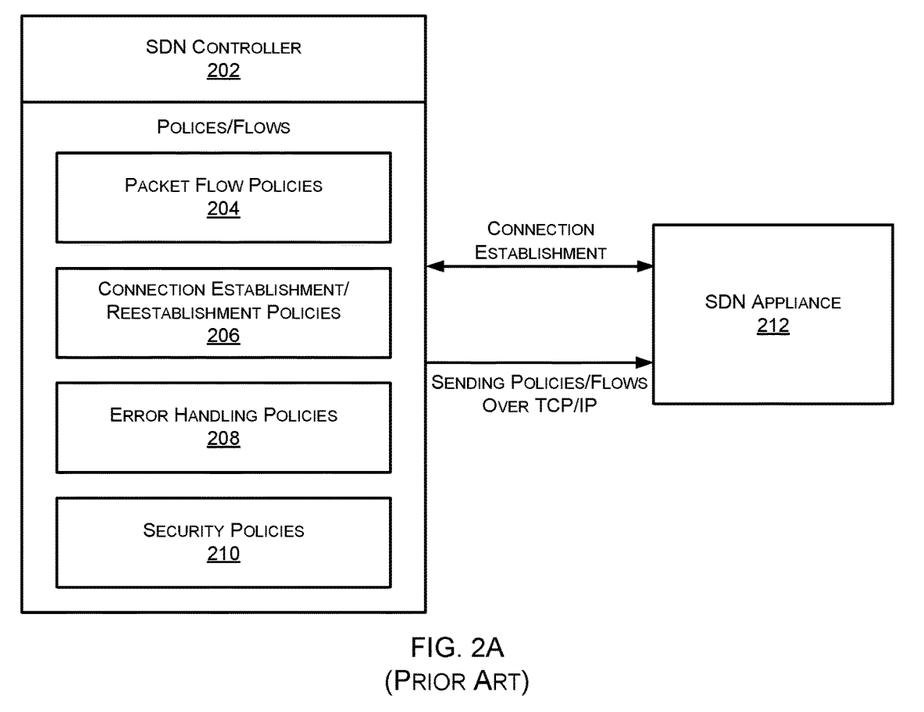
FIG. 2A illustrates prior art flow/policy programming of an SDN appliance by an SDN controller via a TCP/IP connection.

FIG. 2A illustrates prior art flow/policy programming of an SDN appliance 212 by an SDN controller 202 via a TCP/IP connection. As illustrated, a communication channel (e.g., TCP/IP connection) may be established between SDN controller 202 and SDN appliance 212 in order to communicate information regarding active network flows and associated policies (e.g., packet flow policies 204, connection establishment/re-establishment policies 206, error handling policies 208, and security policies 210), from SDN controller 202 to SDN appliance 212, wherein SDN controller 202 can provide direction with respect to how to process a packet of a given flow as needed by SDN appliance 212 as long as the communication channel between the two remains alive. When the established connection between controller 202 and appliance 212 is lost (for whatever reason), transmission of such policies/flows may be interrupted for a period of time.

Figure 2B:
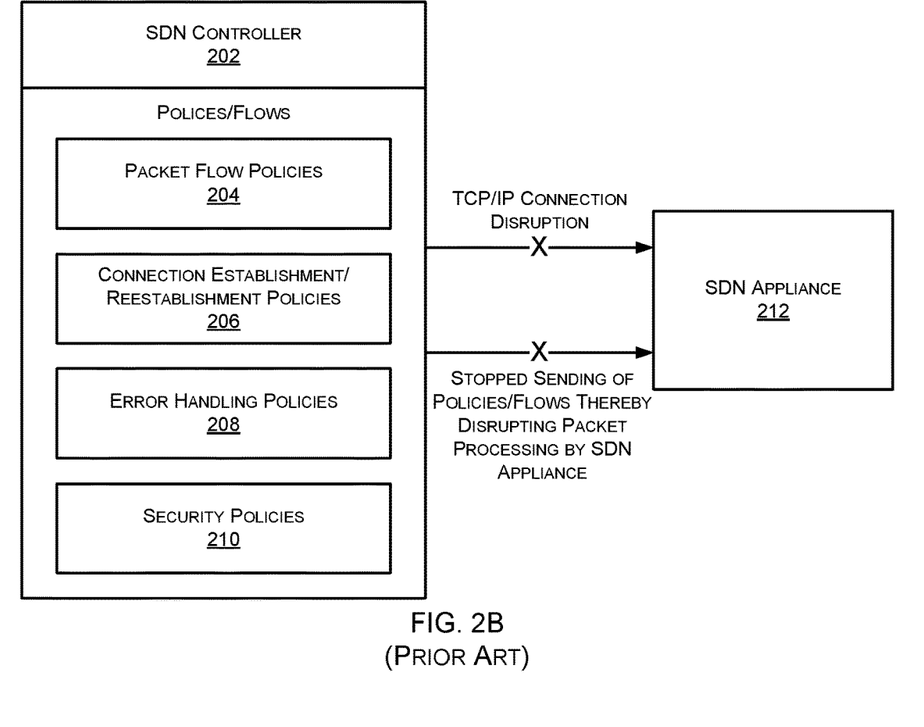
FIG. 2B illustrates a scenario in which the TCP/IP connection between the SDN controller and the SDN appliance is lost or disrupted.

FIG. 2B illustrates a scenario in which a TCP/IP connection between an SDN controller 202 and an SDN appliance 212 is lost or disrupted in accordance with prior art flow/policy programming. As illustrated, when such disruption occurs, packet processing is disrupted as SDN appliance 212 can no longer receive policies/flows (e.g., packet flow policies 204, connection establishment/re-establishment policies 206, error handling policies 208 and security policies 210) from SDN controller 202 and therefore has no direction with regard to how to process network traffic it continues to receive. Such obstruction in packet processing degrades the overall performance of the SDN network.

Figure 3:
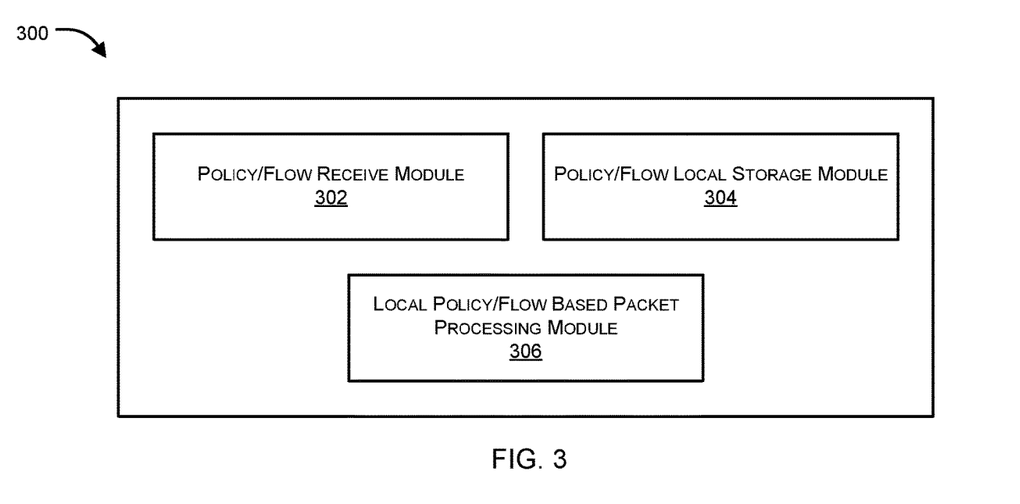
FIG. 3 illustrates exemplary functional modules that may be implemented within an SDN appliance for managing policies/flows in accordance with an embodiment of the present invention.

FIG. 3 illustrates exemplary functional modules that may be implemented within an SDN appliance 300 for managing policies/flows in accordance with an embodiment of the present invention. In the context of the present example, SDN appliance 300 includes a policy/flow receive module 302 configured to receive from an SDN controller, one or more policies/flows; a policy/flow local storage module 304 configured to locally store the received one or more policies/flows within a data store (not shown) internal or external to SDN appliance 300; and a local policy/flow based packet processing module 306 configured to enable, upon receipt of a data packet, SDN appliance 300 to use the locally stored one or more policies/flows for processing the data packet when the SDN controller is not reachable. Those skilled in the art will appreciate that SDN appliance 300 may represent any type of packet processing device in virtual or physical form, including, but not limited to a switch, a gateway, a router, a network security device, a wireless access point and a server.

According to one embodiment, policy/flow receive module 302 can be configured to receive one or more network policies (e.g., packet flow policies, connection establishment/re-establishment policies, error handling policies and security policies) from an SDN controller through a communication protocol, e.g., OpenFlow. Such communication protocol can define standards for requesting by SDN appliance 300 and/or transmission of policies/flows by the SDN controller to SDN appliance 300. In an aspect, a connection (e.g., a TCP/IP connection or any other suitable communication connection) can be established between the SDN controller and SDN appliance 300 to enable transmission of policies/flow from the SDN controller to SDN appliance 300.

In an aspect, one or more packet flow control policies can be received/refreshed/updated at SDN appliance 300 at fixed time intervals or in real-time responsive to a policy change at the SDN controller. Different SDN controllers may issue different types of packet processing policies. In the process of sending new policies, SDN controller may only send an updated set of flow control policies and not the complete set of policies, based on which the receiving SDN appliance may update/replace only those policies currently stored corresponding to the ones received. In alternative interaction scenarios, rather than the SDN controller proactively providing flow control policies in accordance with a push model, SDN appliance 300 may pull the flow control policies from the SDN controller by issuing requests to the SDN controller for direction with regard to how to process a packet of a particular network flow.

Those skilled in the art will appreciate that although various embodiments of the present disclosure are described with respect to packet flow policies, connection establishment/re-establishment policies, error handling policies, and security policies, the methods described herein are applicable to other current or future policies applicable to packet processing performed by SDN appliances.

According to one embodiment, policy/flow local storage module 304 can be configured to store one or more network policies (e.g., packet flow policies, connection establishment/re-establishment policies, error handling policies and security policies), at a storage means/device that is communicatively coupled with SDN appliance 300. In an embodiment, a policy/flow table can be maintained by each SDN appliance within a particular SDN network to store the details of received flows/policies so as to allow the SDN appliances to independently and continuously process network traffic when the SDN controller is unreachable for whatever reason. In this manner, upon receiving one or more data packets, SDN appliance 300 can apply the stored flow policies/flows to process network traffic received during loss or disruption of the connection to the SDN controller. In an aspect, the policy/flow table can include values for one or more parameters, for each active network flow, including, but not limited to, a source and destination IP address, a protocol, a source and destination port, a source and destination media access controller (MAC) address and one or more policy rules specifying how packets associated with the particular flow are to be processed (e.g., forwarded to a network security device for security processing or passed through SDN appliance 300 without such security processing). Policy table can further encompass additional information, including but not limited to, quality-of-service (QoS) attributes, details of previously sent policies, virtual local-area network (VLAN) information, expiry or aging information associated with the network flows and the like.

In an aspect, SDN appliance 300 may also include refresh logic (not shown) to receive any or a combination of fresh/updated packet flow policies, connection establishment/re-establishment policies, error handling policies and security policies, wherein the fresh/updated policies can be received at a local storage that is communicatively coupled with SDN appliance 300 and can be entered in a flow table. In an aspect, storage where the SDN appliance stores the received policies/flows can be an internal storage of SDN appliance 300 or can be an external device storage, e.g. network storage, cloud storage, disk storage that is communicatively coupled with SDN appliance 300. In an exemplary aspect, SDN appliance 300 can be communicatively coupled with one or more local hardware storage devices to store flow/policy tables, wherein the policies can be stored in different forms, e.g., say in a logical table containing rows and columns or as a hierarchical structure or in a tree-based structure.

In an aspect, upon receiving one or more new/fresh policies, the existing policy table that stores current policies can be refreshed. In an alternate embodiment, upon receiving one or more new/fresh policies, a shadow copy of the existing policy table can be created such that when all updates are completed in the original flow table without error, the shadow copy can be deleted. In yet another embodiment, if during an update to the original flow table, any policy update gets disrupted for any reason (e.g., connection error, a hardware error etc.), the shadow copy can be restored and a request for fresh policies can be re-transmitted from SDN appliance 300 to the SDN controller.

In an embodiment, aspects of the present invention enable SDN appliances to be operational in lesser time responsive to loss or disruption of the control connection with the SDN controller as policies/flows are always accessible in the event the SDN controller is unreachable, thereby avoiding the need for SDN appliances to wait for an unreasonable amount of time for the connection to the SDN controller to be reestablished or for a connection to a new SDN controller (e.g., a backup SDN controller) to be established. In this manner, the time required to implement/apply one or more policies to a packet received by SDN appliance 300 can be significantly reduced during periods of control connection disruption and overall SDN network performance can be enhanced.

In an aspect, local policy/flow based packet processing module 306 can be configured to enable, upon receipt of data packet, SDN appliance 300 to use the locally stored one or more policies/flows for processing the data packet when the SDN controller is not reachable. In an aspect, when a data packet arrives, SDN appliance 300 can first attempt to issue a request for an appropriate policy/flow to control processing of the received data packet control flows/policies from the SDN controller. When the policy/flow is received from the SDN controller within a predetermined or configurable time threshold, then it can be used by SDN appliance 300 to direct the processing of the received packet; however, when no response is received from the SDN controller within the predetermined or configurable time period (presumably as a result of a loss or disruption of the connection between the SDN controller and SDN appliance 300), then the flows/ policies that are locally stored within SDN appliance 300 can be used to direct the processing of the received data packet.

In an aspect, SDN appliance 300 can scrutinize its local flow table based on information within the received packet indicative of the network flow with which it is associated to identify the appropriate policy/flow for processing of the received packet. For example, SDN appliance 300 may extract one or more of source and destination IP address, source and destination port and protocol from the header of the received packet so as to identify the appropriate flow(s)/policy(ies) within the local flow table, and accordingly locally process or forward/route the packet through the SDN network based on the identified flow/policy. In an aspect, policies can specify one or more rules/conditions and corresponding steps/actions to be performed on the packets. For instance, packet flow actions can implement security policy for performing anti-virus scanning of packet content or implement error control policy to identify and correct errors.

Figure 4A:
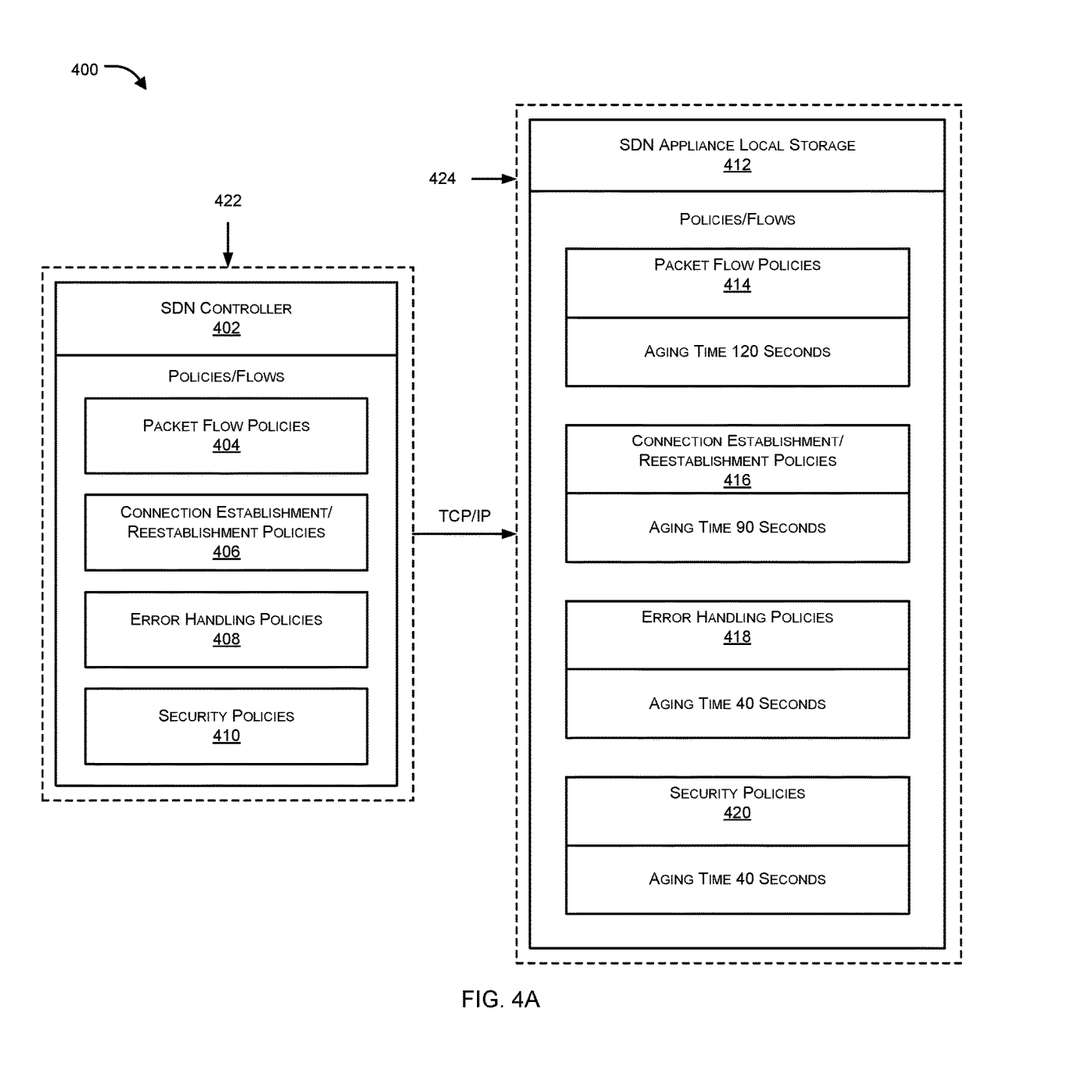
FIG. 4A is a block diagram illustrating local storage of flows/policies in an SDN appliance in accordance with an embodiment of the present invention.

FIG. 4A is a block diagram 400 illustrating policies/flows stored within a local storage 412 of an SDN appliance in accordance with an embodiment of the present invention. As shown, block 422 illustrates an SDN controller 402 that manages network policies/flows (e.g., packet flow policies 404, connection establishment/re-establishment policies 406, error handling policies 408, and security policies 410), wherein the network policies can be transmitted through a network connection (e.g., a TCP/IP connection between SDN controller 402 and an SDN appliance 424) and can be stored, for instance, in local storage 412.

In an embodiment, a table can also be maintained within SDN controller 402, wherein such table can include one or more attributes/information relating to policies, including but not limited to, details of different types of policies, newly added policies, deleted/removed/unused policies, connected SDN appliance configurations, and the like.

As shown, SDN appliance 424 can include local storage 412 that can receive one or more network policies/flows from SDN controller 402 through a network connection (e.g., a TCP/IP connection). In an embodiment, received policies/flows (e.g., packet flow policies 414, connection establishment/re-establishment policies 416, error handling policies 418, and security policies 420) can be associated with a configurable aging/time. In the context of the present example, it is to be understood that packet flow policies 414 comprise all or a part of packet flow policies 404, and likewise for connection establishment/re-establishment policies 406 and 416, error handling policies 408 and 418, and security policies 410 and 420. In an instance, packet flow policies 414 can be configured with a predeterined or configurable aging time (e.g., an aging time of 120 seconds), connection establishment/re-establishment policies 416 can be configured with a predeterined or configurable aging time (e.g., an aging time of 90 seconds), error handling policies 418 can be configured with a predeterined or configurable aging time (e.g., an aging time of 40 seconds), and security policies 420 can be configured with a predeterined or configurable aging time (e.g., an aging time of 40 seconds), after which the respective policies can be automatically rendered invalid and/or removed/deleted from local storage 412. Those skilled in the art will appreciate that aging timers associated with network flows may also be set independently rather than as a group.

In an aspect, aging timer can be so configured so that upon expiry thereof for a given network policy, the respective policy can be replaced with a new policy or rendered invalid or deleted from the locally stored policy table that is maintained by SDN appliance 424. In an alternate embodiment, the aging timer can be used to trigger upon expiration thereof for a given network policy, an updated/refreshed policy to be requested/received from SDN controller 402 and stored in SDN appliance local storage 412. In an exemplary aspect, the aging timer for one or more policies can be defined by SDN controller 402, and may even be different for different SDN appliances.

Figure 4B:
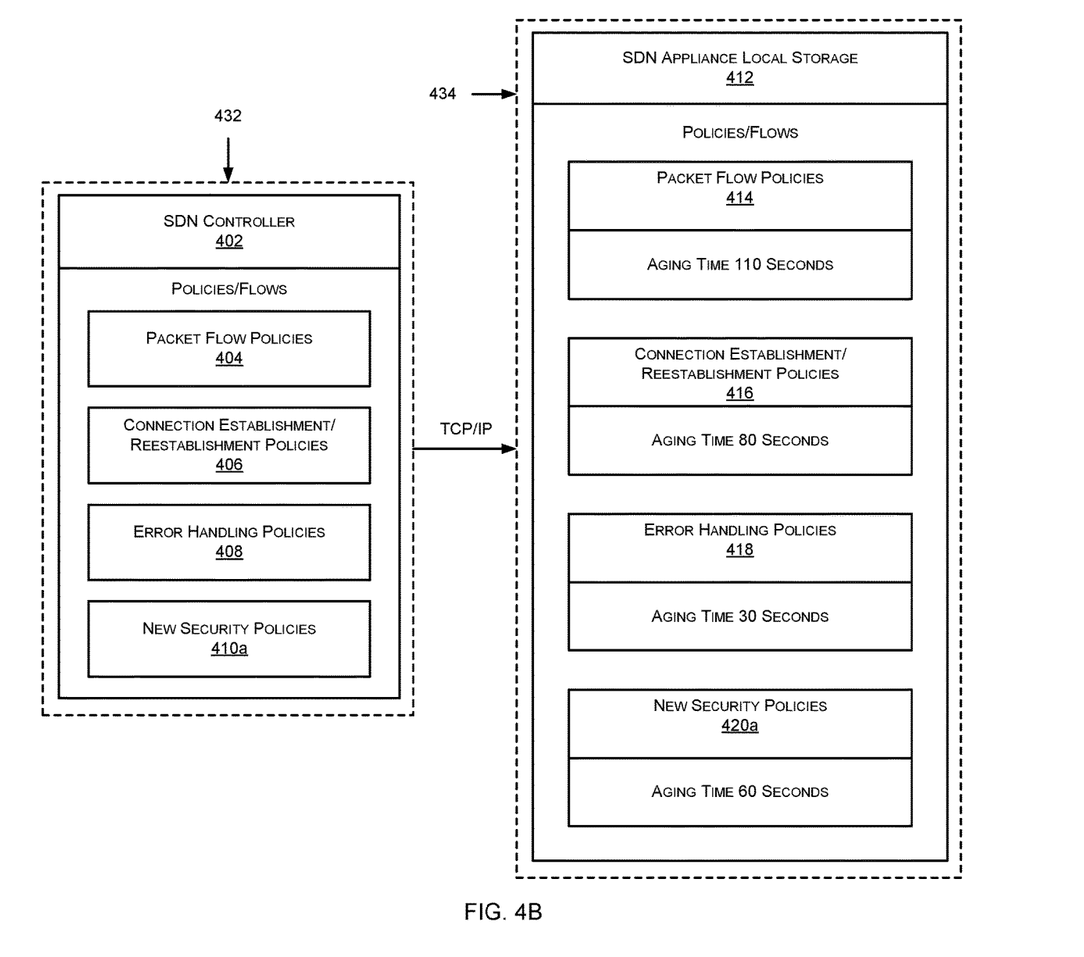
FIG. 4B is a block diagram illustrating aging of locally stored flows/policies within an SDN appliance in accordance with an embodiment of the present invention.

FIG. 4B is a block diagram illustrating aging of locally stored flows/policies within an SDN appliance 464 in accordance with an embodiment of the present invention. The present example assumes aging timers are maintained for each of packet flow policies 404, connection establishment/re-establishment policies 406, error handling policies 408 and new security policies 410a as a group and 10 seconds has elapsed since receipt of the policies/flows in FIG. 4A. For instance, the aging time remaining for packet flow policies 414 is now 110 seconds, the again time remaining for connection establishment/re-establishment policies 416 is now 80 seconds, and the aging time remaining for error handling policies 418 is now 30 seconds. In an exemplary aspect, after the aging/expiration of 10 seconds or at any other time instant, one or more new/updated policies can also be refreshed at SDN appliance local storage 412. For instance, security policies 420 can be updated and received as new security policies 420a at the SDN appliance local storage 412 (from SDN controller 402) with such new security policies 420a having a revised aging timer of 60 seconds. Therefore, in an implementation, each policy received from SDN controller and stored locally by SDN appliance can be associated with an aging timer. In an instance, a first policy that remains same for a large period of time (say packet filtering policy) can have a relatively longer aging time when compared with a second policy that is expected to change in shorter time intervals.

Figure 4C:
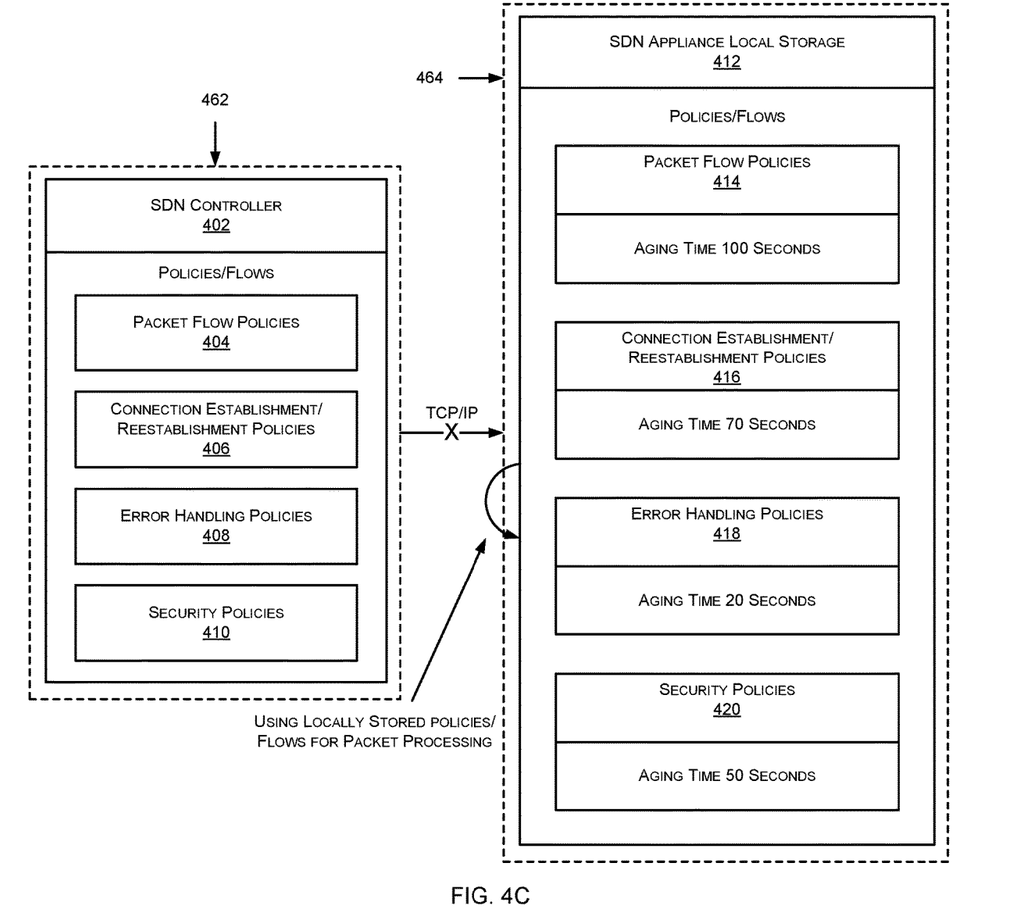
FIG. 4C is a block diagram illustrating the use of locally stored flows/policies by an SDN appliance when an SDN controller is not reachable in accordance with an embodiment of the present invention.

FIG. 4C is a block diagram illustrating use of locally stored flows/policies by an SDN appliance 464 when an SDN controller 402 is not reachable in accordance with an embodiment of the present invention. Block 462 illustrates SDN controller 402 that manages network policies/flows (e.g. packet flow policies 404, connection establishment/re-establishment policies 406, error handling policies 408, and security policies 410) that can be transmitted from a SDN controller 402, through a network connection (e.g. a TCP/IP connection), to an SDN appliance local storage 412. In an exemplary implementation, after expiration of, for instance, 20 seconds from the initially configured aging time as shown in FIG. 4A, transmission of network policies/flows from SDN controller 402 to SDN appliance local storage 412 may be disrupted. Such disruption may occur as a result of various reasons including, but not limited to, disruption of the TCP/IP connection established between SDN controller 402 and SDN appliance 464, or due to planned/unplanned restart of SDN controller 402 or SDN appliance 464, or due to congestion or delays in communications between SDN controller 402 and SDN appliance 464 as a result of a TCP/IP refresh, among other reasons. In such a scenario, as illustrated in block 464, SDN appliance storage 412 will stop receiving network policies/flows from SDN controller 402, and can instead start using locally stored policies/flows for packet processing.

In an aspect, SDN appliance 464 can continue to use its locally stored policies/flows until the connection between SDN appliance 464 and SDN controller 202 is re-established. After such reestablishment, the locally stored flows/policies may continue to be used by SDN appliance 464 for packet processing until they timeout or alternatively, upon reestablishment, the locally stored policies/flows may be flushed out by SDN appliance 464 and replaced by new policies/flows received from SDN controller 402.

Figure 4D:
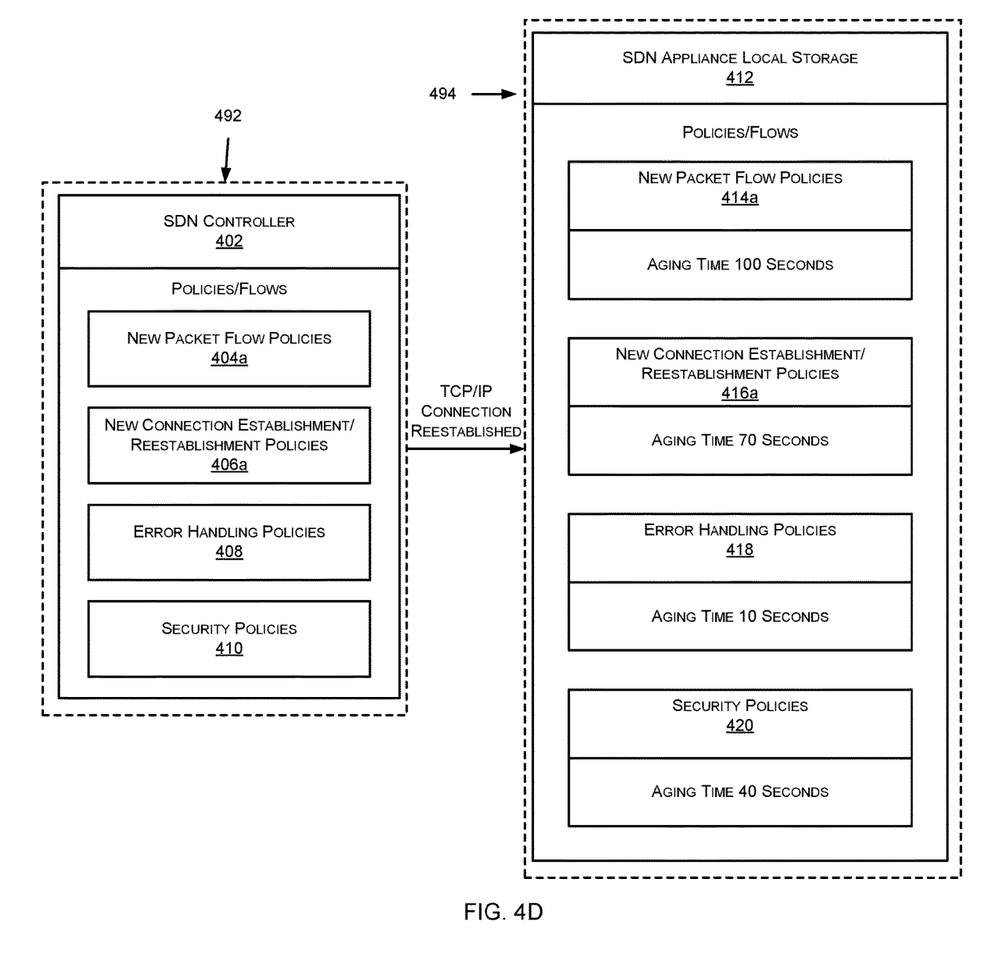
FIG. 4D is a block diagram illustrating the receipt of new flows/policies when the TCP/IP connection between an SDN appliance and an SDN controller is reestablished following loss or disruption of the connection in accordance with an embodiment of the present invention.

FIG. 4D is a block diagram illustrating receipt of new flows/policies when the TCP/IP connection between an SDN appliance 494 and an SDN controller 402 is reestablished following loss or disruption of the connection in accordance with an embodiment of the present invention. Block 492 illustrates SDN controller 402 that can manage network policies/flows (e.g., new packet flow policies 404*a*, new connection establishment/re-establishment policies 406*a*, error handling policies 408, and security policies 410), wherein network policies can be transmitted from SDN controller 402, through a re-established network communication connection, to SDN appliance local storage 412. Block 494 illustrates SDN appliance storage 412 that can again start receiving one or more network policies/flows after re-establishing communication connection between SDN appliance 494 and SDN controller 402. In an aspect, new packet flow policies 414*a* can be received with an updated aging timer of 100 seconds, new connection establishment/re-establishment policies 416*a* can be received with updated aging timer of 70 seconds. In an exemplary aspect, as both error handling policies 408 and security policies 410 are not refreshed, their aging timer can continue from the time at which the connection disruption occurred or from when the connection with SDN controller is re-established, as the system may be actually configured/implemented. As would be appreciated, aging timer does not change/decrement during the time the connection between appliance and SDN controller is disrupted.

In an aspect, upon re-establishment of the connection between SDN appliance and SDN controller 402, the old policies may be retained and their respective aging timers may be started. In another aspect, when the SDN controller 402 pushes a new flow/policy set, flows/policies that got refreshed by the new set are replaced, and the old flows/policies that are not refreshed by the SDN controller in the new set can be aged out. In an aspect, flows/policies can be locally stored/updated in SDN appliances on a periodic basis, say every 5 seconds or so, or in real-time whenever the flows/polices are actually changed/updated by the SDN controller. In another aspect, flows/policies can be distributed across one or more SDN appliances such that when SDN controller goes down, SDN appliances can communicate with each other to fetch the flows/policies.

Figure 5A:
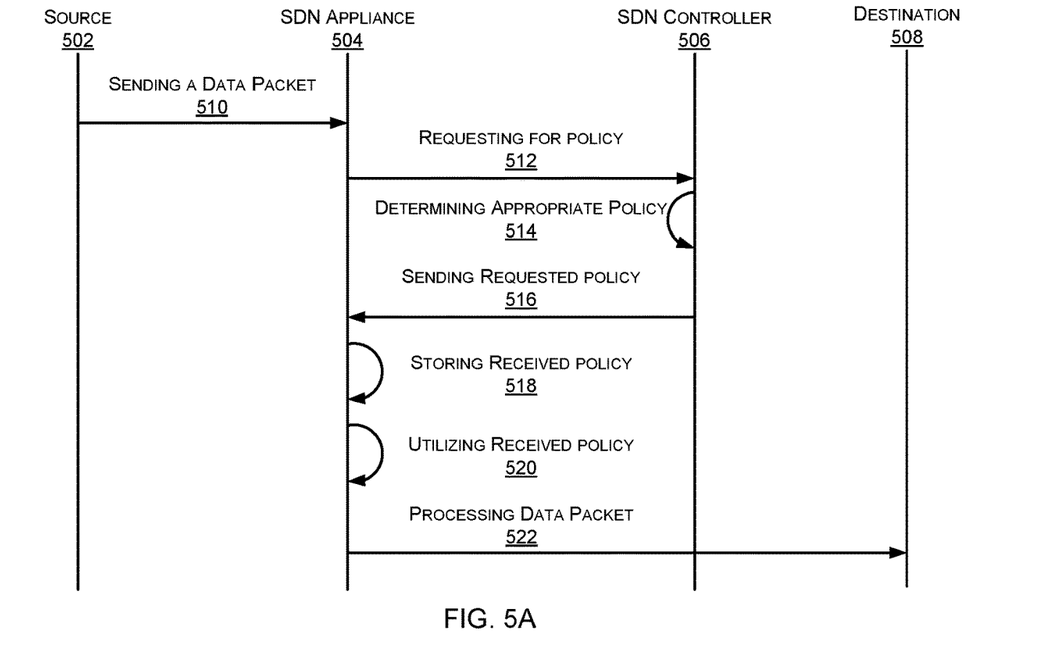
FIG. 5A is a sequence diagram illustrating the request and receipt of policies/flows when a TCP/IP connection exists between an SDN appliance and an SDN controller in accordance with an embodiment of the present invention.

FIG. 5A is a sequence diagram illustrating the request and receipt of policies/flows when a TCP/IP connection exists between an SDN appliance and an SDN controller in accordance with an embodiment of the present invention. In an aspect, the method can include the steps of, at step (510), sending/transmitting a data packet from a source 502 to an SDN appliance 504; at step (512), transmitting a request for flow control policy by the SDN appliance 504 to an SDN controller 506; and at step (514) determining an appropriate policy by the SDN controller 506. The method can further include the step of, at step (516), sending the requested policy from the SDN controller 506 to the SDN appliance 504; at step (518), locally storing the received policy at the storage associated with the SDN appliance 504; at step (520) implementing/utilizing the received policy on the packet received from a source 502; and at step (522) processing the data packet to a destination 508 in accordance with the received policy.

Figure 5B:
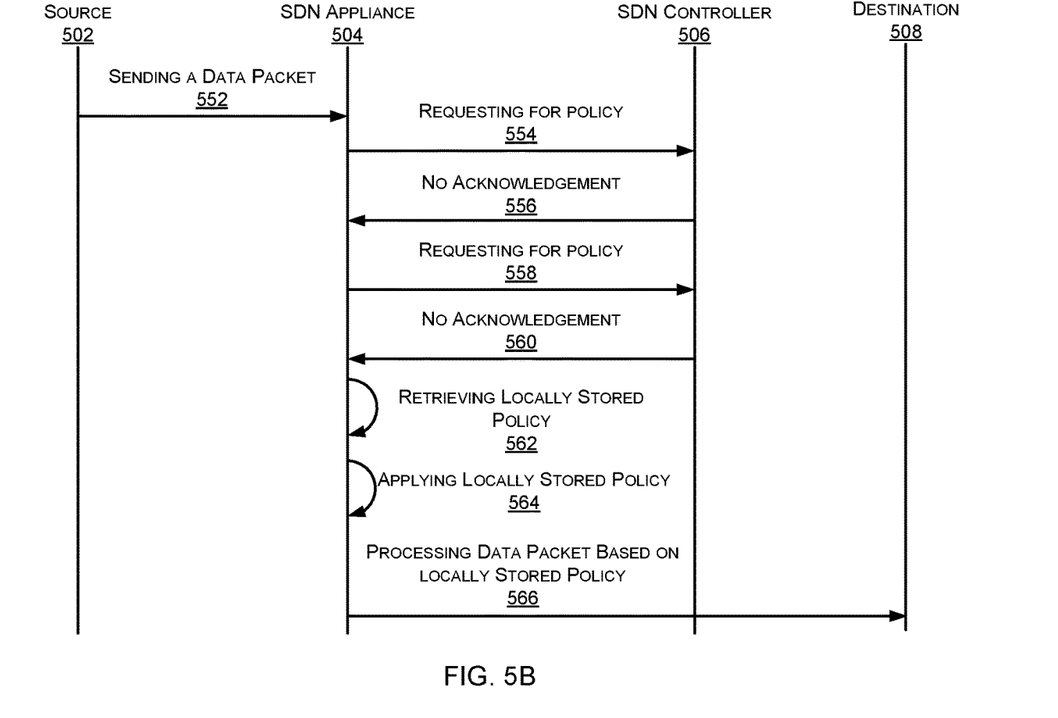
FIG. 5B is a sequence diagram illustrating the use of locally stored policies/flows when a TCP/IP connection between an SDN appliance and an SDN controller is lost or disrupted in accordance with an embodiment of the present invention.

FIG. 5B is a sequence diagram illustrating the use of locally stored policies/flows when TCP/IP connection between an SDN appliance and an SDN controller is lost or disrupted in accordance with an embodiment of the present invention. In an aspect, the method can include the steps of, at step (552), sending/transmitting a data packet from a source 502 to an SDN appliance 504; at step (554), transmitting a request for policy from SDN appliance 504 to an SDN controller 506; and at step (556) determining that no acknowledgement is received at the SDN appliance 504 from the SDN controller 506. The method can further include the step of, at step (558), transmitting another request for policy from SDN appliance 504 to a SDN controller 506 after a defined time interval; at step (560), determining again that no acknowledgement is received at the SDN appliance 504 from the SDN controller 506; at step (562) retrieving locally stored policy from the SDN appliance storage; at step (564), applying the retrieved locally stored policy; and at step (566), processing the data packet to a destination 508 based on the locally stored policy.

Figure 6:
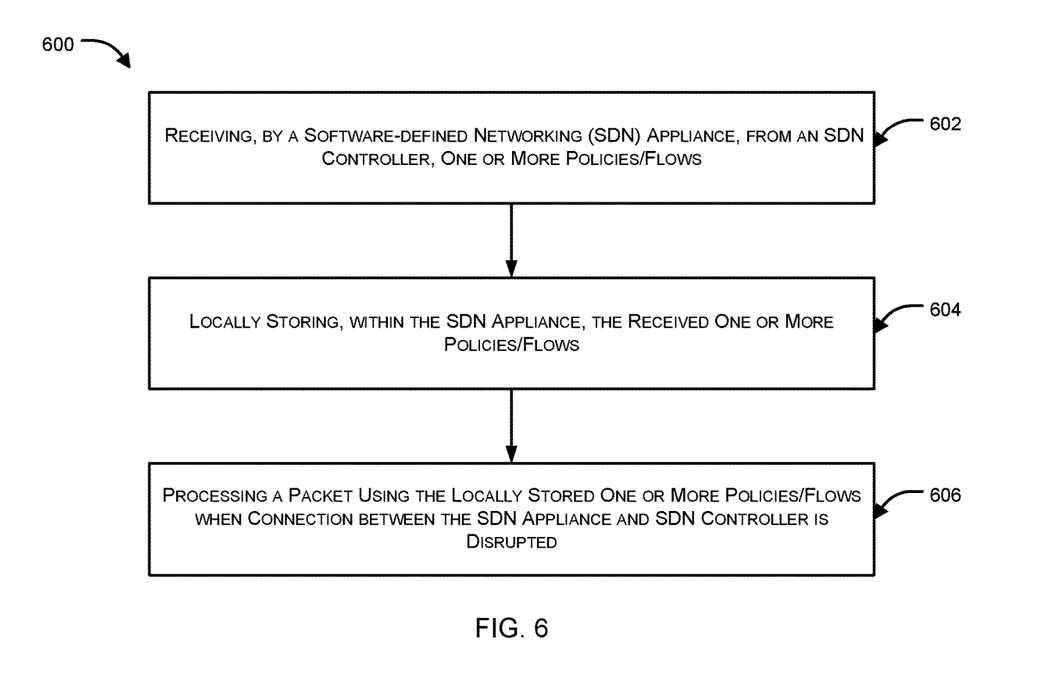
FIG. 6 is a flow diagram illustrating use of locally stored flows/policies by an SDN appliance when an SDN controller is not reachable in accordance with an embodiment of the present invention

FIG. 6 is a flow diagram 600 illustrating use of locally stored flows/policies by an SDN appliance when an SDN controller is not reachable in accordance with an embodiment of the present invention. In an aspect, the method can include the steps of, at step (602), receiving, by an SDN appliance, from an SDN controller, one or more policies/flows; at step (604), locally storing, within the SDN appliance, the received one or more policies/flows; and at step (606), responsive to receipt of a packet to be processed by the SDN appliance, sending, by the SDN appliance, a query to the SDN controller requesting an appropriate policy or flow for the packet such that when a response to the query is not received from the SDN controller within a predefined or configurable timeout period, processing, by the SDN appliance, the packet based on the locally stored one or more policies/flows.

Figure 7:
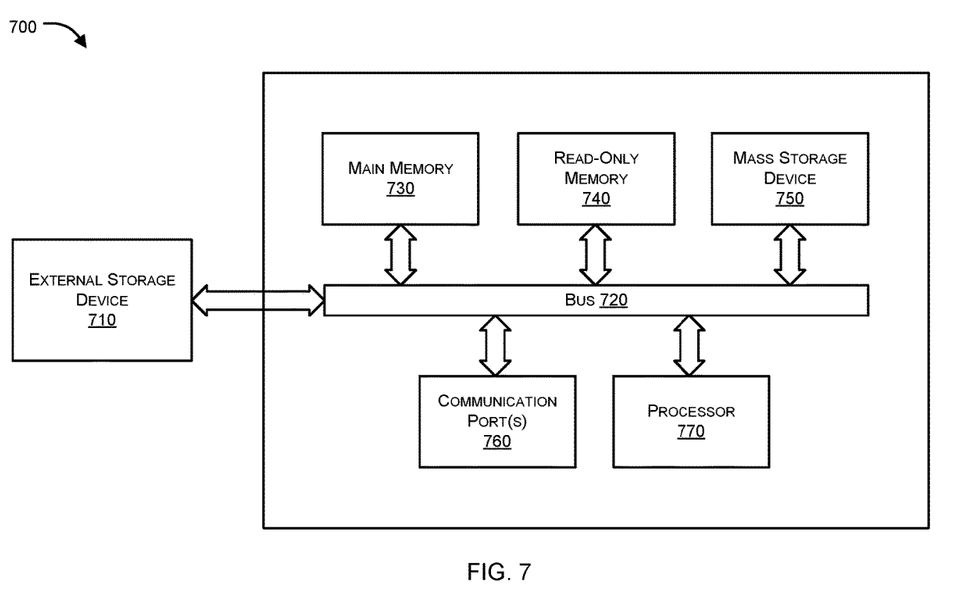
FIG. 7 illustrates an exemplary computer system in which or with which embodiments of the present invention may be utilized.

FIG. 7 illustrates an exemplary computer system 700 in which or with which embodiments of the present invention may be utilized. Computer system 700 may represent an SDN controller (e.g., SDN controller 102 or 202), an SDN appliance (e.g., SDN appliance 154, 300, 424, 434, 464, 494 or 504) or a network security device (e.g., security appliance 158).

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown in the figure, computer system 700 includes an external storage device 710, a bus 720, a main memory 730, a read only memory 740, a mass storage device 750, communication port 760, and a processor 770. A person skilled in the art will appreciate that computer system 700 may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects. Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system. Optionally, operator and administrative interfaces, e.g. a display, keyboard, and a cursor control device, may also be coupled to bus 720 to support direct operator interaction with computer system 700. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A method comprising:
   locally maintaining, by a software-defined networking (SDN) appliance, a policy/flow table containing a plurality of dynamic policies/flows provided to the SDN appliance by an SDN controller; and
   responsive to receipt, by the SDN appliance from the SDN controller, of one or more new/fresh policies/flows that are to replace the plurality of dynamic policies/flows:
      creating, by the SDN appliance, a shadow copy of the policy/flow table containing the plurality of dynamic policies/flows;
      performing, by the SDN appliance, an update to the policy/flow table based on the one or more new/fresh policies; and
      responsive to the update being disrupted as a result of the SDN controller becoming unreachable:
         restoring, by the SDN appliance, the policy/flow table to its pre-update state based on the shadow copy; and
         notifying, by the SDN appliance, the SDN controller regarding the update disruption; and
         applying known good policies/flows to network traffic passing through the SDN appliance during a period in which the SDN controller remains unreachable, by processing, by the SDN appliance, network traffic received by the SDN appliance in accordance with the plurality of dynamic policies/flows contained in the restored policy/flow table.

2. The method of claim 1, wherein said notifying comprises issuing, by the SDN appliance to the SDN controller, a request for fresh policies/flows.

3. The method of claim 1, wherein the SDN controller is unreachable as a result of any or a combination of a planned restart of the SDN controller, an unplanned restart of the SDN controller, an operational error in the SDN controller and a network connection disruption between the SDN controller and the SDN appliance.

4. The method of claim 1, further comprising responsive to a connection between the SDN controller and the SDN appliance being re-established, invalidating, by the SDN appliance, the plurality of dynamic policies/flows.

5. The method of claim 1, further comprising responsive to a connection between the SDN controller and the SDN appliance being re-established, removing and replacing, by the SDN appliance, at least a part of the plurality of dynamic policies/flows by a new set of one or more policies/flows received from the SDN controller.

6. The method of claim 1, further comprising responsive to a connection between the SDN controller and the SDN appliance being re-established, invalidating, by the SDN appliance, the plurality of dynamic policies/flows by implementing an aging timer for each of the dynamic policies/flows.

7. The method of claim 1, wherein the SDN appliance comprises a network security device and wherein one or more of the plurality of dynamic policies/flows comprise a security policy to be applied by the network security device.

8. A non-transitory computer-readable storage medium embodying a set of instructions, which when executed by one or more processors of a software-defined networking (SDN) appliance, causes the one or more processors to perform a method comprising:
   locally maintaining a policy/flow table containing a plurality of dynamic policies/flows provided to the SDN appliance by an SDN controller; and
   responsive to receipt of one or more new/fresh policies/flows from the SDN controller that are to replace the plurality of dynamic policies/flows:
      creating a shadow copy of the policy/flow table containing the plurality of dynamic policies/flows;
      performing an update to the policy/flow table based on the one or more new/fresh policies; and
      responsive to the update being disrupted as a result of the SDN controller becoming unreachable:
         restoring the policy/flow table to its pre-update state based on the shadow copy; and
         notifying the SDN controller regarding the update disruption; and
         applying known good policies/flows to network traffic passing through the SDN appliance during a period in which the SDN controller remains unreachable, by processing network traffic received by the SDN appliance in accordance with the plurality of dynamic policies/flows contained in the restored policy/flow table.

9. The non-transitory computer-readable storage medium of claim 8, wherein said notifying comprises issuing to the SDN controller a request for fresh policies/flows.

10. The non-transitory computer-readable storage medium of claim 8, wherein the SDN controller is unreachable as a result of any or a combination of a planned restart of the SDN controller, an unplanned restart of the SDN controller, an operational error in the SDN controller and a network connection disruption between the SDN controller and the SDN appliance.

11. The non-transitory computer-readable storage medium of claim 8, wherein the method further comprises responsive to a connection between the SDN controller and the SDN appliance being re-established, invalidating the plurality of dynamic policies/flows.

12. The non-transitory computer-readable storage medium of claim 8, wherein the method further comprises responsive to a connection between the SDN controller and the SDN appliance being re-established, removing and replacing at least a part of the plurality of dynamic policies/flows by a new set of one or more policies/flows received from the SDN controller.

13. The non-transitory computer-readable storage medium of claim 8, wherein the method further comprises responsive to a connection between the SDN controller and the SDN appliance being re-established, invalidating the plurality of dynamic policies/flows by implementing an aging timer for each of the dynamic policies/flows.

14. The non-transitory computer-readable storage medium of claim 8, wherein the SDN appliance comprises a network security device and wherein one or more of the plurality of dynamic policies/flows comprise a security policy to be applied by the network security device.

15. A software-defined networking (SDN) appliance comprising:
   a non-transitory storage device having embodied therein instructions; and
   one or more processors coupled to the non-transitory storage device and operable to execute the instructions to perform a method comprising:
      locally maintaining a policy/flow table containing a plurality of dynamic policies/flows provided to the SDN appliance by an SDN controller; and responsive to receipt of one or more new/fresh policies/
flows from the SDN controller that are to replace the
plurality of dynamic policies/flows:
- creating a shadow copy of the policy/flow table
containing the plurality of dynamic policies/flows;
- performing an update to the policy/flow table based
on the one or more new/fresh policies; and
- responsive to the update being disrupted as a result
of the SDN controller becoming unreachable:
  - restoring the policy/flow table to its pre-update
  state based on the shadow copy; and
  - notifying the SDN controller regarding the update
  disruption; and
- applying known good policies/flows to network
traffic passing through the SDN appliance during a period in which the SDN controller
remains unreachable, by processing network
traffic received by the SDN appliance in accordance with the plurality of dynamic policies/
flows contained in the restored policy/flow
table.

16. The SDN appliance of claim 15, wherein said notifying comprises issuing to the SDN controller a request for fresh policies/flows.

17. The SDN appliance of claim 15, wherein the SDN controller is unreachable as a result of any or a combination of a planned restart of the SDN controller, an unplanned restart of the SDN controller, an operational error in the SDN controller and a network connection disruption between the SDN controller and the SDN appliance.

18. The SDN appliance of claim 15, wherein the method further comprises responsive to a connection between the SDN controller and the SDN appliance being re-established, invalidating the plurality of dynamic policies/flows.

19. The SDN appliance of claim 15, wherein the method further comprises responsive to a connection between the SDN controller and the SDN appliance being re-established, removing and replacing at least a part of the plurality of dynamic policies/flows by a new set of one or more policies/flows received from the SDN controller.

20. The SDN appliance of claim 15, wherein the SDN appliance is coupled to a network security device and wherein one or more of the plurality of dynamic policies/flows comprise a security policy that directs matching network traffic to the network security device.

\* \* \* \* \*